United States Patent Office 2,999,018
Patented Sept. 5, 1961

2,999,018
INSTANT OATMEAL
George W. Huffman, Lake Zurich, and James W. Moore, Palatine, Ill., assignors to The Quaker Oats Company, Chicago, Ill., a corporation of New Jersey
No Drawing. Filed Oct. 14, 1957, Ser. No. 689,772
7 Claims. (Cl. 99—83)

This invention relates to an instant-type rolled oats product which can be prepared as a ready-to-eat hot porridge by simply adding hot water.

If hot water is added to ordinary rolled oats the resulting product has a raw uncooked flavor and a coarse texture not at all like cooked oatmeal. To obtain an acceptable porridge it is necessary to cook the mixture at boiling temperature for at least one minute. The preparation requires the use of a cooking pot in addition to a bowl in which the porridge is served.

It is an object of this invention to provide a rolled oats food product which may be prepared as a porridge by the mere addition of hot water in a serving bowl.

Another object of the invention is to provide an instant-type rolled oats product which upon the addition of hot water acquires the flavor and texture characteristics of cooked oatmeal.

These objects are accomplished by adding to rolled oats an edible polysaccharide gum in an amount sufficient to produce a cooked flavor and texture but insufficient to produce a pasty texture on addition of hot water.

Edible polysaccharide gums include both true gums of vegetable origin and synthetic gums such as carboxymethyl cellulose, methyl cellulose and other cellulose derivatives which approximate the vegetable gums in physical and chemical properties. Both types of gums when mixed with rolled oats are capable of hydrating rapidly with the addition of hot water to form gelatinous films on the oat flakes.

"True gums" are gums of vegetable origin which are soluble in water or swell in contact with water to form viscous colloidal solutions. They are insoluble in oils, alcohol, benzene, and other organic solvents. A general classification of such gums is as follows:

(A) Plant gums—dried exudates from certain trees or shrubs in the form of tears, flakes or angular fragments that have been formed by bark fissures or incisions. The more important ones include acacia (gum arabic), Australian, Cape, carmania, gedda, ghatti, karaya, mesquite, mogadore, Persian, shiraz, talha and tragacanth. Others of lesser importance include amrad, angico, apricot, brea, cashew, cebil, cedar, chagual, cherry, damson, jeol, mango, plum and sassa.

(B) Plant mucilages—derived from seeds, roots or other plant parts usually by extraction with water. This class includes althea root, chia seed, Iceland moss, linseed (flaxseed), locust bean, psyllium seed, quince seed, slippery elm bark and guar bean.

(C) Mucilaginous materials known as hydrophylic colloids obtained from two general groups of brown and red algae. This class includes agar, Irish moss (carragheen) and algin.

When the source material for the gum is acidic, i.e. algin and Irish moss, the commercially available edible gum is a derivative of the acid such as a soluble salt or ester, i.e. propylene glycol ester of alginic acid. In general, to be satisfactory any gum employed must be edible, have no undesirable flavor, and disperse rapidly in hot water.

The rolled oats employed in this invention are of the quick-cooking type as distinguished from the old-fashioned type. Quick-cooking rolled oats are generally prepared by processing steps involving successively, dehulling, steel-cutting in a rotary-type granulator, softening with steam, and flaking with steel rolls. However, the rolled oats employed in this invention may be produced by any process which results in a rolled flake constituting a fractional portion only of the whole groat (dehulled oat) from which it is derived.

To produce our instant rolled oats product the polysaccharide gum in commercially available powdered form is dry mixed with the rolled oats. An alternative procedure would be to dissolve or disperse the gum in water and apply the resulting solution to the rolled oats by means such as spraying.

The amount of gum added must be carefully controlled. Sufficient gum must be added to the rolled oats to produce a cooked flavor and texture when hot water is subsequently added to the mixture. If too much gum is added the resulting product has a pasty texture on addition of hot water. The amount of gum necessary to achieve the desired result will vary according to the particular gum employed. However, all of the gums are employed in an amount between about 0.1% to 1.0% (preferably about 0.5% to about 0.7%) by weight of the rolled oats.

The invention will be further illustrated but is not limited by the following examples in which the quantities are stated in parts by weight unless otherwise indicated:

Example 1

Six parts of guar bean gum (Jaguar A-20-A, Stein, Hall & Company) were dry mixed with one thousand parts of quick-cooking rolled oats which had been produced conventionally according to the aforementioned description.

Example 2

Six parts carboxymethyl cellulose (CMC 70-S extra fine, Hercules Powder Company) were dry mixed with one thousand parts of the rolled oats described in Example 1.

Example 3

Six parts of a propylene glycol derivative of alginic acid (Kelcoloid HV, Kelco Company) were dry mixed with one thousand parts of the rolled oats described in Example 1.

Example 4

Six parts of a carragheen gum (Gelcarin MR-45, Algin Corporation of America) were dry mixed with one thousand parts of the rolled oats described in Example 1.

Example 5

Six parts of locust bean gum (Stein, Hall & Company) were dry mixed with one thousand parts of the rolled oats described in Example 1.

Example 6

Six parts gum tragacanth were dry mixed with one thousand parts of the rolled oats described in Example 1.

The products of Examples 1–6 were tested as instant hot cereals employing the following recipe:

Place ⅓ cup of oatmeal in a cereal bowl. Sprinkle with salt. Pour ½ cup of boiling water over the oatmeal and stir until blended. Add cream and sugar and serve.

The hot porridges obtained with the products of each of the above examples were found to have a typical cooked flavor and a texture and mouth feel approximating that of conventionally cooked oatmeal.

It is contemplated, alternatively, that mixtures of the aforementioned gums may be employed instead of a single gum. A given weight of two or more of the gums is generally equivalent to the same weight of a single gum.

We claim:
1. An instant-type food product which upon the addition of boiling water and without need for further heating acquires the flavor and texture characteristics of cooked oatmeal, said product comprising essentially quick-cooking rolled oats and an edible polysaccharide gum capable of hydrating rapidly with the addition of said water, said gum being present in an amount between about 0.1% and about 1.0% by weight of the rolled oats.

2. An instant-type food product which upon the addition of boiling water and without need for further heating acquires the flavor and texture characteristics of cooked oatmeal, said product comprising essentially quick-cooking rolled oats and an edible polysaccharide gum capable of hydrating rapidly with the addition of said water, said gum being present in an amount between about 0.5% and about 0.7% by weight of the rolled oats.

3. A product according to claim 2 wherein said gum is guar gum.

4. A product according to claim 2 wherein said gum is carragheen gum.

5. A product according to claim 2 wherein said gum is locust bean gum.

6. A product according to claim 2 wherein said gum is carboxymethyl cellulose.

7. A product according to claim 2 wherein said gum is gum tragacanth.

References Cited in the file of this patent

UNITED STATES PATENTS

| | | |
|---|---|---|
| 1,943,374 | Dreyfus | July 8, 1931 |
| 2,890,118 | Cantor et al. | June 9, 1959 |

FOREIGN PATENTS

| | | |
|---|---|---|
| 438,509 | Great Britain | Nov. 13, 1935 |